(12) United States Patent
Pilly et al.

(10) Patent No.: US 11,420,655 B2
(45) Date of Patent: Aug. 23, 2022

(54) SYSTEM AND METHOD FOR SAFETY AND EFFICACY OVERRIDE OF AN AUTONOMOUS SYSTEM

(71) Applicant: HRL Laboratories, LLC, Malibu, CA (US)

(72) Inventors: Praveen K. Pilly, West Hills, CA (US); Nicholas A. Ketz, Topanga, CA (US); Michael D. Howard, Westlake Village, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 131 days.

(21) Appl. No.: 16/900,145

(22) Filed: Jun. 12, 2020

(65) Prior Publication Data

US 2021/0094587 A1 Apr. 1, 2021

Related U.S. Application Data

(60) Provisional application No. 62/906,269, filed on Sep. 26, 2019.

(51) Int. Cl.
*B60W 60/00* (2020.01)
*B60W 40/08* (2012.01)

(52) U.S. Cl.
CPC ........ *B60W 60/0059* (2020.02); *B60W 40/08* (2013.01); *B60W 60/007* (2020.02); *B60W 60/0051* (2020.02)

(58) Field of Classification Search
CPC .. B60W 40/09; B60W 60/0054; B60W 50/14; B60W 50/08; G06N 3/0454;
(Continued)

(56) References Cited

U.S. PATENT DOCUMENTS 9,785,145 B2 10/2017 Gordon et al.
2011/0081073 A1* 4/2011 Skipper ............... G06K 9/6262
382/159
(Continued)

FOREIGN PATENT DOCUMENTS

CN 106740114 A * 5/2017 ............. B60K 35/00
CN 110222406 A * 9/2019 ............. G06F 17/50
(Continued)

OTHER PUBLICATIONS

Dutordoir, V., Salimbeni, H., Deisenroth, M., & Hensman, J. (2018). Gaussian Process Conditional Density Estimation. ArXiv:1810. 12750, pp. 1-19.

(Continued)

*Primary Examiner* — Yuri Kan
(74) *Attorney, Agent, or Firm* — Tope-Mckay & Associates

(57) ABSTRACT

Described is a system for competency assessment of an autonomous system. The system extracts semantic concepts representing a situation. Actions taken by the autonomous system are associated with semantic concepts that are activated when the actions are taken in the situation. The system measures an outcome of the actions taken in the situation and generates a reward metric. The semantic concepts representing the situation are stored as a memory with the actions taken in the situation and the reward metric as a memory. A prospective simulation is generated based on recall of the memory. A competency metric and an experience metric are determined. Competent operational control of the autonomous system is maintained when at least one of the competency metric and the experience metric is above a minimum value. An alert is generated when at least one of the competency metric and the experience metric falls below the minimum value.

20 Claims, 7 Drawing Sheets

(58) Field of Classification Search
CPC ........ G06N 3/04; G06K 9/6262; B60K 31/00; B60K 35/00; B60K 31/0008; G06F 17/50; G06V 40/165

See application file for complete search history.

(56) References Cited

U.S. PATENT DOCUMENTS

| | | | |
|---|---|---|---|
| 2018/0118219 A1 | 5/2018 | Hiei et al. | |
| 2020/0151562 A1* | 5/2020 | Pietquin | G06N 3/0454 |
| 2021/0061298 A1* | 3/2021 | Balachandran | B60W 60/0054 |
| 2021/0284173 A1* | 9/2021 | Ohnishi | B60W 50/14 |

FOREIGN PATENT DOCUMENTS

| | | | | | |
|---|---|---|---|---|---|
| DE | 102014224765 A1 | * | 6/2016 | | G06V 40/165 |
| JP | 2015182526 A | * | 10/2015 | | B60W 50/08 |
| JP | 2018062321 A | * | 4/2018 | | B60K 31/0008 |
| JP | 6520066 B2 | * | 5/2019 | | B60K 31/00 |
| WO | WO-2016092796 A1 | * | 6/2016 | | B60W 50/08 |
| WO | WO2019002465 A1 | | 1/2019 | | |

OTHER PUBLICATIONS

Fawcett, Tom (2006). "An Introduction to ROC Analysis". Pattern Recognition Letters. 27 (8): pp. 861-874.

Ketz, N., Kolouri, S., & Pilly, P. (2019). Using World Models for Pseudo-Rehearsal in Continual Learning. ArXv:1903.02647, pp. 1-16.

Kansky K, et al., (2017). "Schema networks: Zero-Shot Transfer with a Generative Causal Model of Intuitive Physics." In Proceedings of the 34th International Conference on Machine Learning. vol. 70: pp. 1809-1818.

Kolouri, Soheil, Charles E. Martin, and Heiko Hoffmann. (2017). "Explaining Distributed Neural Activations via Unsupervised Learning." In CVPR Workshop on Explainable Computer Vision and Job Candidate Screening Competition, vol. 2, pp. 1670-1678.

Merrild, J., Rasmussen, M. A., & Risi, S. (2018). "HyperNTM: Evolving Scalable Neural Turing Machines through HyperNEAT." International Conference on the Applications of Evolutionary Computation, pp. 750-766.

Daftry, S., Zeng, S., Bagnell, J.A., and Hebert, M. (2016). "Introspective Perception: Learning to Predict Failures in Vision Systems." In 2016 IEEE/RSJ International Conference on Intelligent Robots and Systems (IROS), pp. 1743-1750.

Mnih, V., Kavukcuoglu, K., Silver, D., Rusu, A.A., Veness, J., Bellemare, M.G., Graves, A., Riedmiller, M., Fidjeland, A. K., Ostrovski, G. and Petersen, S. (2015). "Human-Level Control Through Deep Reinforcement Learning." Nature, 518 (7540), pp. 529-533.

Miikkulainen, R., Liang, J., Meyerson, E., Rawal, A., Fink, D., Francon, O., and Hodjat, B. (2019). "Evolving Deep Neural Networks." In Artificial Intelligence in the Age of Neural Networks and Brain Computing, pp. 293-312.

Pilly, P.K., Howard, M.D., and Bhattacharyya, R. (2018). "Modeling Contextual Modulation of Memory Associations in the Hippocampus" Frontiers in Human Neuroscience, 12, pp. 1-20.

Liou, Cheng-Yuan; Huang, Jau-Chi; Yang, Wen-Chie. (2008). "Modeling Word Perception Using the Elman Network". Neurocomputing 71 (2008), pp. 3150-3157.

Notification of Transmittal, The International Search Report, and the Written Opinion of the International Searching Authority for PCT/US2020/037468; dated Sep. 23, 2020.

Brett W Israelsen, et al: "a Dave . . . I can assure you . . . that ita s going to be all right . . . a a Definition, Case for, and Survey of Algorithmic Assurances in Human-Autonomy Trust Relationships," ACM Computing Surveys, ACM, New York, NY, US, vol. 51, No. 6, Jan. 28, 2019 (Jan. 28, 2019), pp. 1-37, XP058426006.

Yunqi Zhao, et al: "Winning Isn't Everything: Enhancing Game Development with Intelligent Agents," arxiv.org, Cornell University Library, 201 Olin Library Cornell University Ithaca, NY 14853, Mar. 25, 2019 (Mar. 25, 2019), XP081465577.

Notification of the International Preliminary Report On Patentability Chapter 1 for PCT/US2020/037468; dated Apr. 7, 2022.

The International Preliminary Report On Patentability Chapter 1 for PCT/US2020/037468; dated Apr. 7, 2022.

* cited by examiner

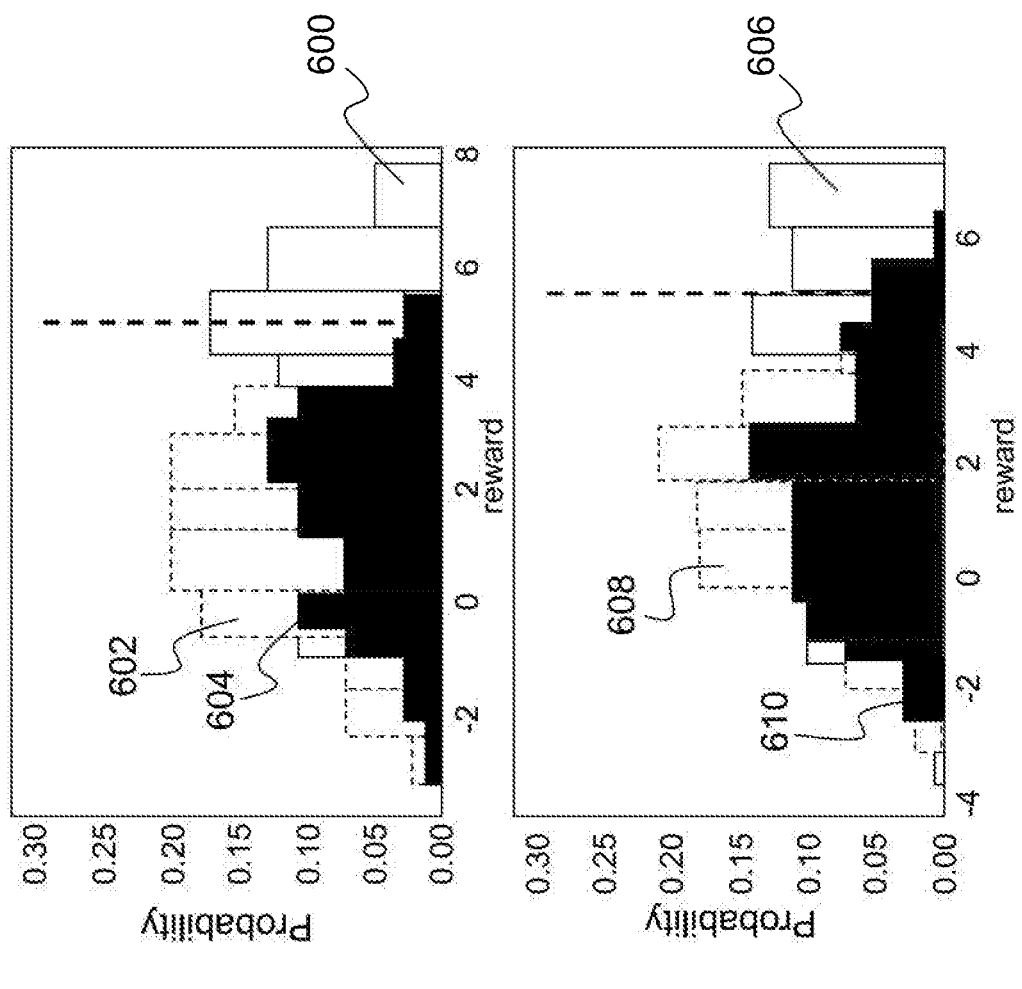

SYSTEM AND METHOD FOR SAFETY AND EFFICACY OVERRIDE OF AN AUTONOMOUS SYSTEM

CROSS-REFERENCE TO RELATED APPLICATIONS

The present application is a Non-Provisional Application of U.S. Provisional Application No. 62/906,269, filed in the United States on Sep. 26, 2019, entitled, "System and Method for Autonomous System Introspection," the entirety of which is incorporated herein by reference.

BACKGROUND OF INVENTION

(1) Field of Invention

The present invention relates to a system for competency assessment of an autonomous system, and more particularly, to a system for competency assessment of an autonomous system that can initiate a handover to a human or a assistive system in situations where it predicts low competency.

(2) Description of Related Art

Autonomous systems need to continually estimate their ability to handle upcoming situations. The prior art, such as Daftry et al. (see Literature Reference No. 9 in the List of Incorporated Literature References), for competency estimates and warnings uses deep learning, which only works well in a well-defined, controlled situation, is based only on kinematic projections a frame in advance, and is incapable of assessing competency for hypothetical future situations.

Kansky et al (see Literature Reference No. 4) showed that even subtle changes to the input can result in catastrophic failure for the deep network. There is no established method in the field to address the over-sensitivity of deep networks to small changes in the inputs (or low-level features). The prior art is, thus, incapable of assessing competency for hypothetical and novel situations. Moreover, prior art directly predicts a biased competency metric, prone to response bias. Further, the prior art does not assess depth of experience.

Thus, a continuing need exists for a system which has the ability to not only learn and adapt and show resilient adaptation in dealing with situations it has not been trained or programmed to handle, but also to know which of those situations it is capable of handling competently, and when to ask for help. Humans can be more confident in a machine that knows its limits.

SUMMARY OF INVENTION

The present invention relates to a system for competency assessment of an autonomous system, and more particularly, to a system for competency assessment of an autonomous system that can initiate a handover to a human or a assistive system in situations where it predicts low competency. The system comprises one or more processors and a non-transitory computer-readable medium having executable instructions encoded thereon such that when executed, the one or more processors perform multiple operations. The system extracts a plurality of semantic concepts representing a situation. Actions taken by the autonomous system are associated with a set of semantic concepts that are activated when the actions are taken in the situation. Using task-specific reward functions of the autonomous system's performance, the system measures an outcome of the actions taken in the situation and generates a reward metric. The plurality of semantic concepts representing the situation are stored together with the actions taken in the situation and the reward metric as a memory. A prospective simulation is generated based on recall of the memory. Based on the prospective simulation, the system determines at least one of a competency metric representing competency of the autonomous system in the situation and an experience metric representing experience of the autonomous system in the situation. Competent operational control of the autonomous system is maintained when at least one of the competency metric and the experience metric is above an established minimum allowable value. An alert is generated when at least one of the competency metric and the experience metric falls below the established minimum allowable value.

In another aspect, the system determines a depth-of experience estimation representing a density of visitation at any point in a learned latent space conditioned on a task objective.

In another aspect, the competency metric is a Receiver-Operator Characteristic (ROC) curve-based competency metric.

In another aspect, the system initiates handover of control of the autonomous system to a user when at least one of the competency metric and the experience metric falls below the established minimum allowable value.

In another aspect, the system initiates handover of control from a human user to an assistive system when at least one of the competency metric and the experience metric falls below the established minimum allowable value.

In another aspect, the autonomous system is an autonomous driving system.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6A illustrates prospective simulations' true and lure reward distributions for an agent trained on twenty million frames according to some embodiments of the present disclosure;

FIG. 6B illustrates prospective simulations' true and lure reward distributions for an agent trained on one million frames according to some embodiments of the present disclosure;

DETAILED DESCRIPTION

Figure 1:
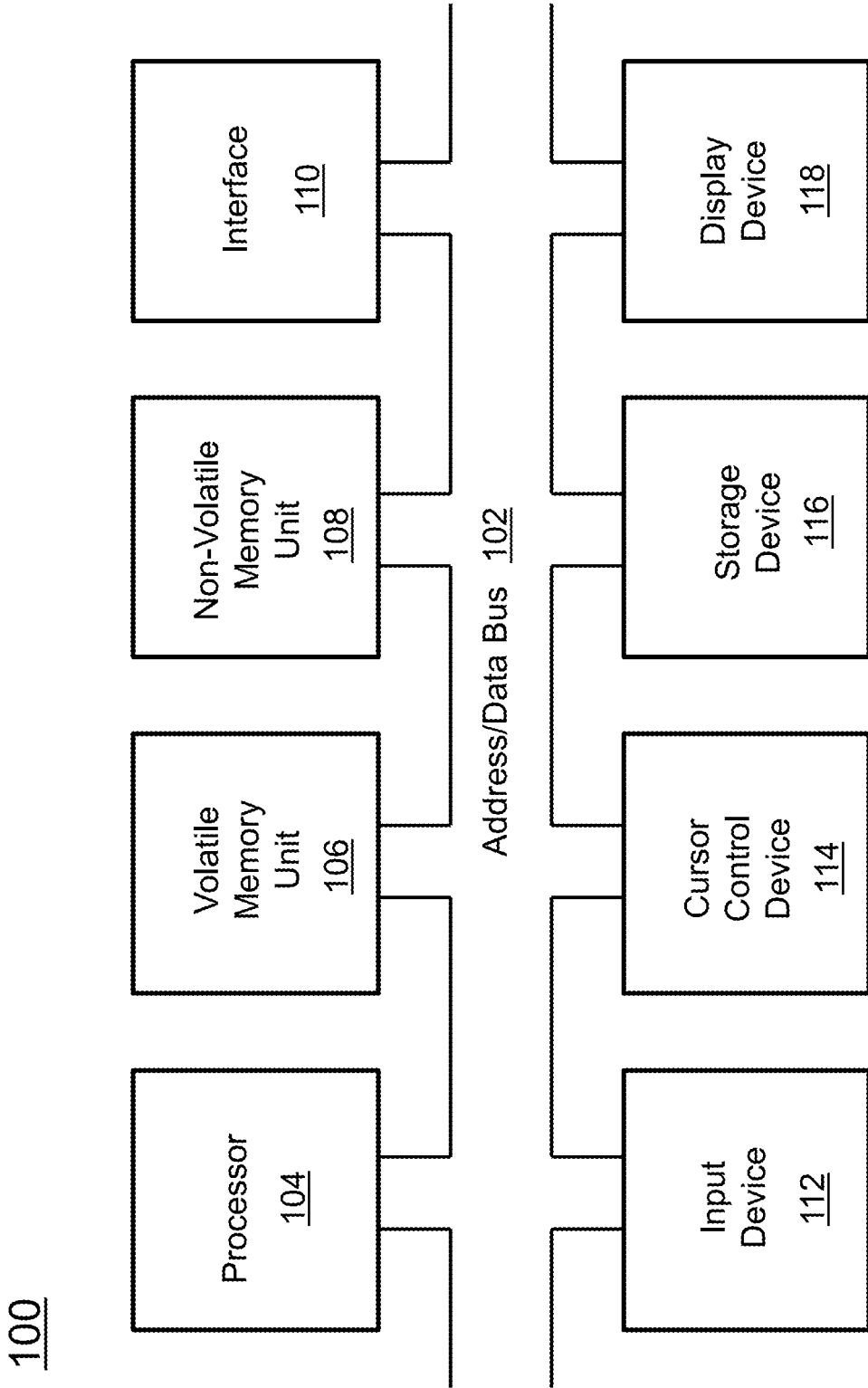
FIG. 1 is a block diagram depicting the components of a system for competency assessment of an autonomous system according to some embodiments of the present disclosure.

The present invention relates to a system for competency assessment of an autonomous system, and more particularly, to a system for competency assessment of an autonomous system which can learn and adapt to new situations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Dutordoir, V., Salimbeni, H., Deisenroth, M., & Hensman, J. (2018). Gaussian Process Conditional Density Estimation. ArXiv:1810.12750.
2. Fawcett, Tom (2006). "An Introduction to ROC Analysis". Pattern Recognition Letters. 27 (8): 861-874.
3. Ketz, N., Kolouri, S., & Pilly, P. (2019). Using World Models for Pseudo-Rehearsal in Continual Learning. ArXiv:1903.02647.
4. Kansky K, Silver T, Mély D A, Eldawy M, Lázaro-Gredilla M, Lou X, Dorfman N, Sidor S, Phoenix S, George D. (2017). "Schema networks: Zero-Shot Transfer with a Generative Causal Model of Intuitive Physics." In Proceedings of the 34th International Conference on Machine Learning. Volume 70: 1809-1818.
5. Kolouri, Soheil, Charles E. Martin, and Heiko Hoffmann. (2017). "Explaining Distributed Neural Activations via Unsupervised Learning." In CVPR Workshop on Explainable Computer Vision and Job Candidate Screening Competition, vol. 2.
6. Liou, Cheng-Yuan; Huang, Jau-Chi; Yang, Wen-Chie. (2008). "Modeling Word Perception Using the Elman Network". Neurocomputing. 71 (16-18): 3150.
7. Merrild, J., Rasmussen, M. A., & Risi, S. (2018). "Hyper-NTM: Evolving Scalable Neural Turing Machines through HyperNEAT." International Conference on the Applications of Evolutionary Computation, 750-766.
8. Daftry, S., Zeng, S., Bagnell, J. A., and Hebert, M. (2016). "Introspective Perception: Learning to Predict Failures in Vision Systems." In 2016 IEEE/RSJ International Conference on Intelligent Robots and Systems (IROS), 1743-1750.
9. Mnih, V., Kavukcuoglu, K., Silver, D., Rusu, A.A., Veness, J., Bellemare, M. G., Graves, A., Riedmiller, M., Fidjeland, A. K., Ostrovski, G. and Petersen, S. (2015). "Human-Level Control Through Deep Reinforcement Learning." Nature, 518(7540), 529-533.
10. Miikkulainen, R., Liang, J., Meyerson, E., Rawal, A., Fink, D., Francon, O., and Hodjat, B. (2019). "Evolving Deep Neural Networks." In Artificial intelligence in the Age of Neural Networks and Brain Computing, 293-312.
11. Pilly, P. K., Howard, M. D., and Bhattacharyya R. (2018). "Modeling Contextual Modulation of Memory Associations in the Hippocampus." Frontiers in Human Neuroscience, 12.

(1) Principal Aspects

Various embodiments of the invention include three "principal" aspects. The first is a system for competency assessment of an autonomous system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform (e.g., one or more autonomous vehicles), or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
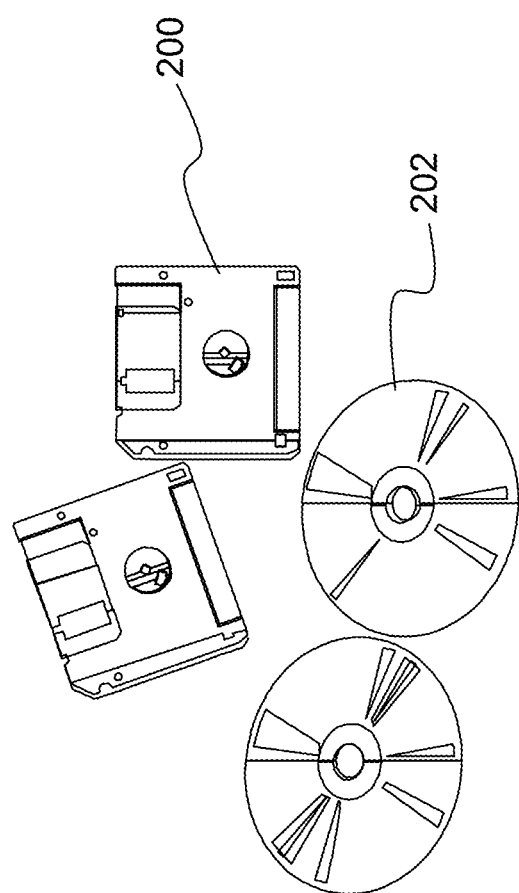
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Autonomous systems need to continually estimate their ability to handle upcoming situations (i.e., an instantaneous proficiency rating). The invention described herein predicts performance in both familiar and novel situations with sufficient time to hand off control to a human user if needed (e.g., 10 or more seconds for autonomous cars). The state of the art (SOA) for competency estimates and warnings is based only on kinematic projections a frame in advance, and is incapable of assessing competency for hypothetical future situations (see Literature Reference No. 8).

The invention described herein continually stores all sequential experiences in a compact, scalable episodic memory. With enough experiences, the invention can initiate the process of learning concepts in order to facilitate generalization beyond the training. Concepts are then continually consolidated into semantic memory. When a novel situation is encountered, it is decomposed into its constituent concepts, and the invention then performs a series of stochastic prospective simulations using both semantic and episodic memories for target and lure task objectives. This yields two dynamic distributions of performance estimates (target and lure) as the simulations rollout into the future. These are akin to the signal and noise distributions in signal detection theory. The farther apart these two distributions are, the higher is the confidence about task competency. This is captured in the unbiased area under a receiver operating characteristic (ROC) curve metric (also known as Area Under the Curve or AUC), which is a single number that captures the competency of the system in similar situations. A competency rating can, therefore, be obtained by ROC curve analysis on the stochastic episodic recalls. Using the present invention, a competency rating can be produced continually during vehicle operation and when it falls below a minimum acceptable value, the control system should hand off control to the user. Thus, the invention gains utility as part of a control system that acts to protect the safety of the user and the autonomous system when the competency rating is low.

In another non-limiting example, the invention according to embodiments of the present disclosure can predict performance of the human user, and predict the human's ability to perform successfully and safely in both familiar and novel situations. In this case, the competency rating is a control signal to an assistive system to tell it when it is necessary to assist the user, or in the case of unsafe conditions, to possibly take over control. For instance, if the competency rating for the human user goes below some threshold, then the assistive system (or backup system) takes over. Thus, two instantiations of the invention are possible: one to introspect on the autonomous system, such as a vehicle, and one to introspect on the user, such as a driver or pilot.

The invention described herein records experiences of a system (e.g., land, sear, or air vehicle, or human), and then computes a measure of the system's competence for handling a particular current or hypothetical situation by introspecting through memories of related situations. Episodic and semantic memories can be stored either implicitly or explicitly. The term "system" is used to describe anything that acts in the environment. The invention learns how this system (i.e., controller or actor) acts in different situations, and is then able to predict the competency of the system in new situations; note that the system may be a land, sea, or air vehicle (autonomous or semi-autonomous), or a human. The invention described herein may be applied to anything that acts in the world, including an adult human, a child human (e.g., a child safety monitor), an autonomous vehicle, a non-autonomous vehicle (e.g., can this vehicle drive on a rocky dirt road without suffering a failure?), a robot, or more abstractly, to a team of individuals such as an army infantry unit faced with a situation involving particular types of weaponry, numbers of adversarial combatants, and types of geography.

A prior art method called Deep Sense Learning (DSL) (element 322) is used to extract semantic concepts (element 320) for meta-knowledge representation of any situation. Sequential episodes and semantic concepts (element 320) experienced by the system are stored in a compact, scalable form using a brain-inspired Episodic World Model (element 318), along with the actions (element 316) (e.g., steering wheel angle, throttle, brake parameters) taken in response, and any reward (element 404) received for the actions. As a non-limiting example, in an autonomous car, the reward for a lane following task is how far from the midline of the lane the car is in.

Episodic sequences of all sensor observations, actions, and instantaneous performance metrics are examples of experiences recorded. In addition, known semantic concepts extracted from the raw data at different granularities (e.g., construction zone, entities involved) can be recorded. The invention described herein supplies a way to keep the set of concepts consistent as new experiences are encoded. Actions (element 316) taken by the system are stored in an Action Generator (AG) module (element 314), associated with the semantic concepts (element 320) activated when they are taken. Learned semantic concepts (element 320) are selectively activated by the current inputs (i.e., sensor data (element 312)). For example, the invention would have learned a number of concepts through its lifetime; however, only a subset of the semantic concepts would be relevant for a particular scene or frame.

Furthermore, as the AG module (element 314) is exposed to more and more situations, it is able to produce generated actions (element 316) that better mimic and anticipate controller actions (element 302) taken by the system, which comprises the PACS (300) and vehicle (304). The invention, comprising EWM (element 318), DSL (element 322), and the AG module (element 314), learns to mimic the behaviors of the platform autonomous control system (element 300). Machine learning, including reinforcement learning, typically maps states/raw inputs (sensor measurements) to actions. The invention described herein additionally extracts semantic concepts (element 320), which are activated selectively by the states/raw inputs, and maps them to actions. Because the system has semantic concepts (element 320) in memory, it can perform the ROC curve analysis also to assess competence for a hypothetical situation, which can be specified, for example, as "follow a leader" on "dirt" and in "rain". Each of these aspects will be described in further detail below.

The prior art uses a metric that suffers response bias (i.e., success probability). In contrast, the invention described herein comprises a method to generate prospective simulations through these memories, and to use these simulations to construct a bias-free Receiver-Operator Characteristic (ROC) curve-based competency metric. A ROC curve is a prior art graphical method that illustrates the diagnostic ability of a binary classifier system as its discrimination threshold is varied (see Literature Reference No. 2). In addition, the invention is used to prospectively assess whether a desired task objective will continue to be met and to quantify the expected deviation. Finally, the invention provides a way to estimate the depth of experience of the system by assessing the density of visitation at any point in the learned latent space conditioned on a given task objective.

The invention described herein generates prospective simulations based on stored episodic sequences, resulting in a contrastive ROC curve competency metric (i.e., the successes of a task with respect to other tasks), which is more informative than mere success probability. It represents the situation in terms of semantic concepts, which make it more generalizable and robust. The invention is an addition to a base machine learning system (hereafter called "the system"), such as the Platform Autonomous Control System (PACS) (element 300) illustrated in FIG. 3, which is trained to accomplish a set of different tasks (namely, different operating objectives or commands). The system can be a deep reinforcement learning neural network or a rule-based expert system, or indeed, a human being; in any case, the system is a black box that maps environmental states into controller actions (element 302), having implicitly learned multiple distinct strategies that are appropriately deployed under different environmental conditions. The invention, then, learns how the system produces actions in response to different situations, and how effective those actions are. Subsequently, the invention can produce a warning or alert (e.g., visual warning on display in vehicle, audible warning such as beep or tone) when the system has not shown itself to have competency in a given situation.

Figure 3:
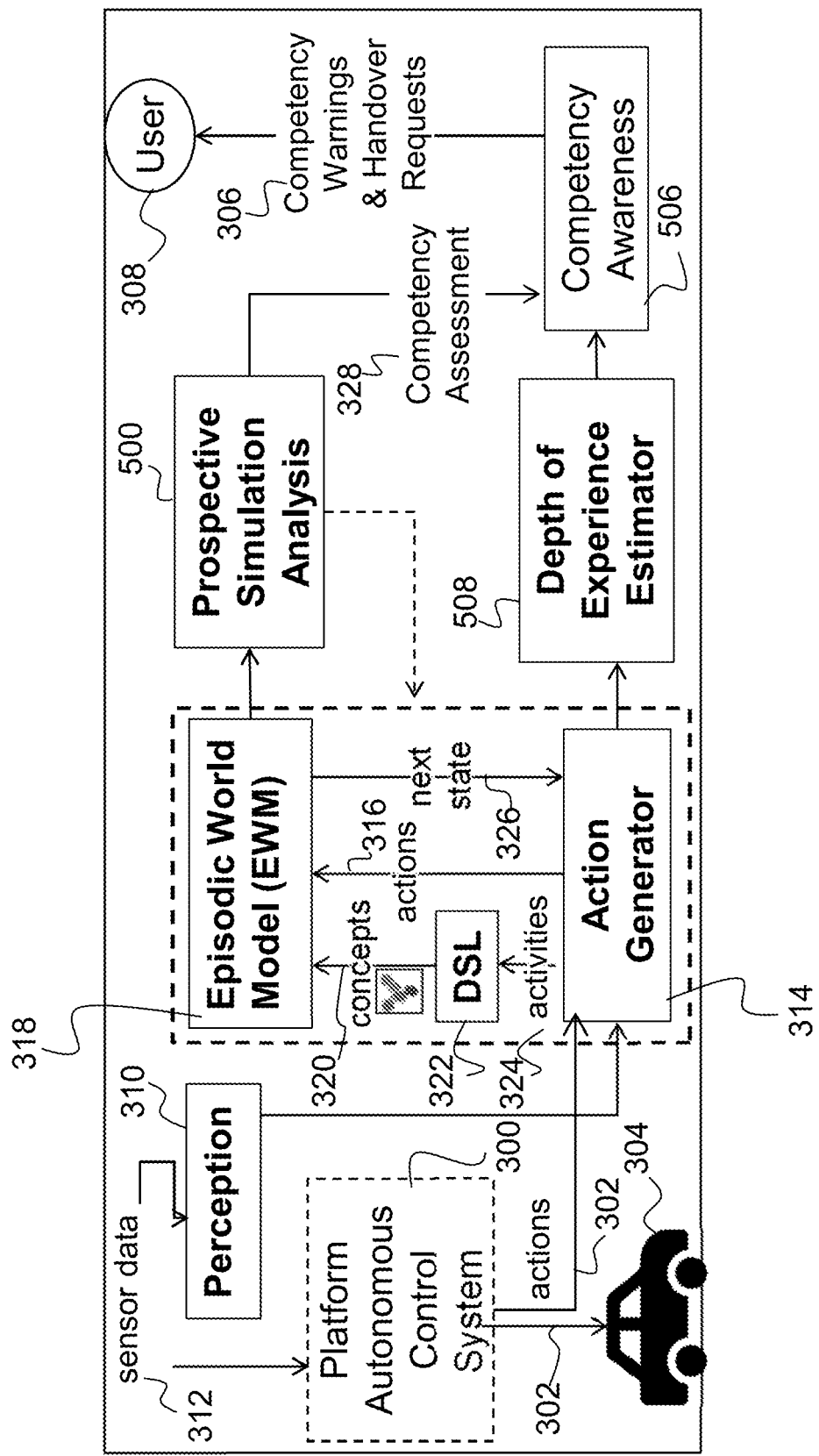
FIG. 3 is an illustration of operation of a method for autonomous system introspection according to some embodiments of the present disclosure.

FIG. 3 depicts the multiple modules that comprise the invention. The modules function to learn from the environment and estimate the competency of a vehicle (element 304)), and results in competency warnings and handover requests (element 306). Note that the roles of the vehicle (element 304) and the user (element 308) can be switched for a different use case (not shown), in which the system analyzed by the invention is the user (element 308), and the invention estimates competency of the user and informs the vehicle when the user needs assistance.

(3.1) Perception Module (Element 310)

Figure 4:
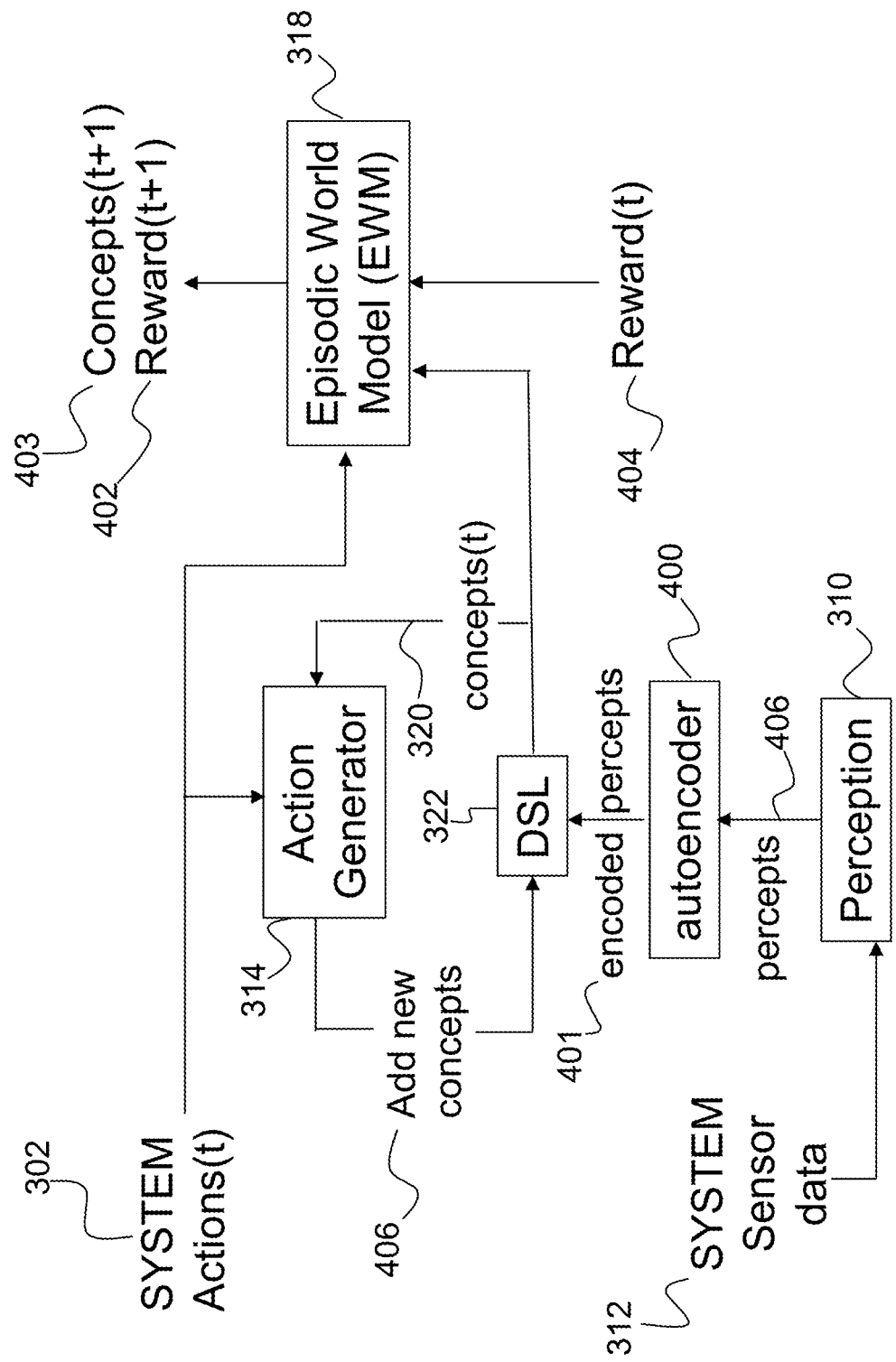
FIG. 4 is an illustration of training of the Action Generator according to some embodiments of the present disclosure.

The Perception module (element 310) encodes sensor data (element 312) into a latent representation using a prior art Autoencoder (element 400 in FIG. 4). Autoencoders are prior art artificial neural networks used for learning efficient codings. They are well-known to those skilled in the art. The aim of an autoencoder is to learn a representation (encoding) for a set of data, typically for the purpose of dimensionality reduction. See Literature Reference No. 6 for a detailed description of automatic encoding using the Elman network.

External inputs to the Perception module (element 310) include low-level signals from various sensors (i.e., sensor data (element 312)), such as cameras, LIDAR, RADAR, GPS, and weather. Internal sensing of the state of the system with respect to the external environment (proprioception), such as the velocity and relative position of a vehicle in the world, is another input to the Perception module (element 310).

(3.2) Action Generator (Element 314)

Outputs of the Perception module (element 310), which are the latent representations of the sensor data, go into the Action Generator (element 314), which learns the mapping from the Perceptual module (element 310) context to the actions (element 302) taken by the vehicle (element 304). The Action Generator (element 314) module is implemented by an actor-critic model (see Literature Reference No. 9) a well-known method of reinforcement learning in which the system acts, and based on the resulting reward, a critic system adapts the actor implemented by an evolving recurrent actor-critic network to learn reward-driven actions for various tasks based on situational context and memory recall. Neuroevolution is used to optimize the perception-action modules of the Action Generator (element 314), CoDeepNEAT (see Literature Reference No. 10), for direct encoding and HyperNEAT (see Literature Reference No. 7) for indirect encoding. The action choice (element 316) is output to the Episodic World Model (element 318).

FIG. 4 illustrates how the Action Generator (element 314) is trained. During the first offline period, the log of online experiences is used for the evolutionary optimization of the modular structure of the Action Generator (element 314) to match the actions of the system (e.g., vehicle (element 304)) as much as possible over the online data. Concepts (element 320) are extracted by DSL (element 322) from the activations/activities (element 324) in the Action Generator (element 314) over the same data.

(3.3) Deep Sense Learning (DSL) (Element 322)

Deep Sense Learning (DSL) (element 322) is a prior art system of Kolouri et al. (see Literature Reference No. 5) used to extract and cluster activities in the Action Generator (element 314) network, as shown in FIGS. 3 and 4. These activity clusters (i.e., activities (element 324)) are employed as symbolic representations of the inputs that evoked them, and are kept consistent across experiences as novel elements are learned. There is no need for the concepts to be semantically meaningful; but since similar (but not identical) inputs can give rise to similar activity clusters, they are used to generalize the encoded sensor data from the Perception module (element 310). When a new feature in the environment is different enough that the activity clusters in the Action Generator network (element 314) change significantly, all networks that depend on the DSL concepts (element 320) are retrained and reorganized to incorporate the new concept (element 406) without forgetting previous ones. This is done offline using interleaved training with a combination of most recent data and generative data for prior experiences. Random noise in the input layer is used to trigger simulated rollouts of previously experienced episodes based on consolidated associations between Action Generator (element 314) activities and concepts (see prospective simulation section). Kolouri et al. (see Literature Reference No. 5) demonstrated a 42.5% reduction in classification error with incorporation of DSL extracted concepts into a deep network, due to the generalization capability it provides.

Figure 5:
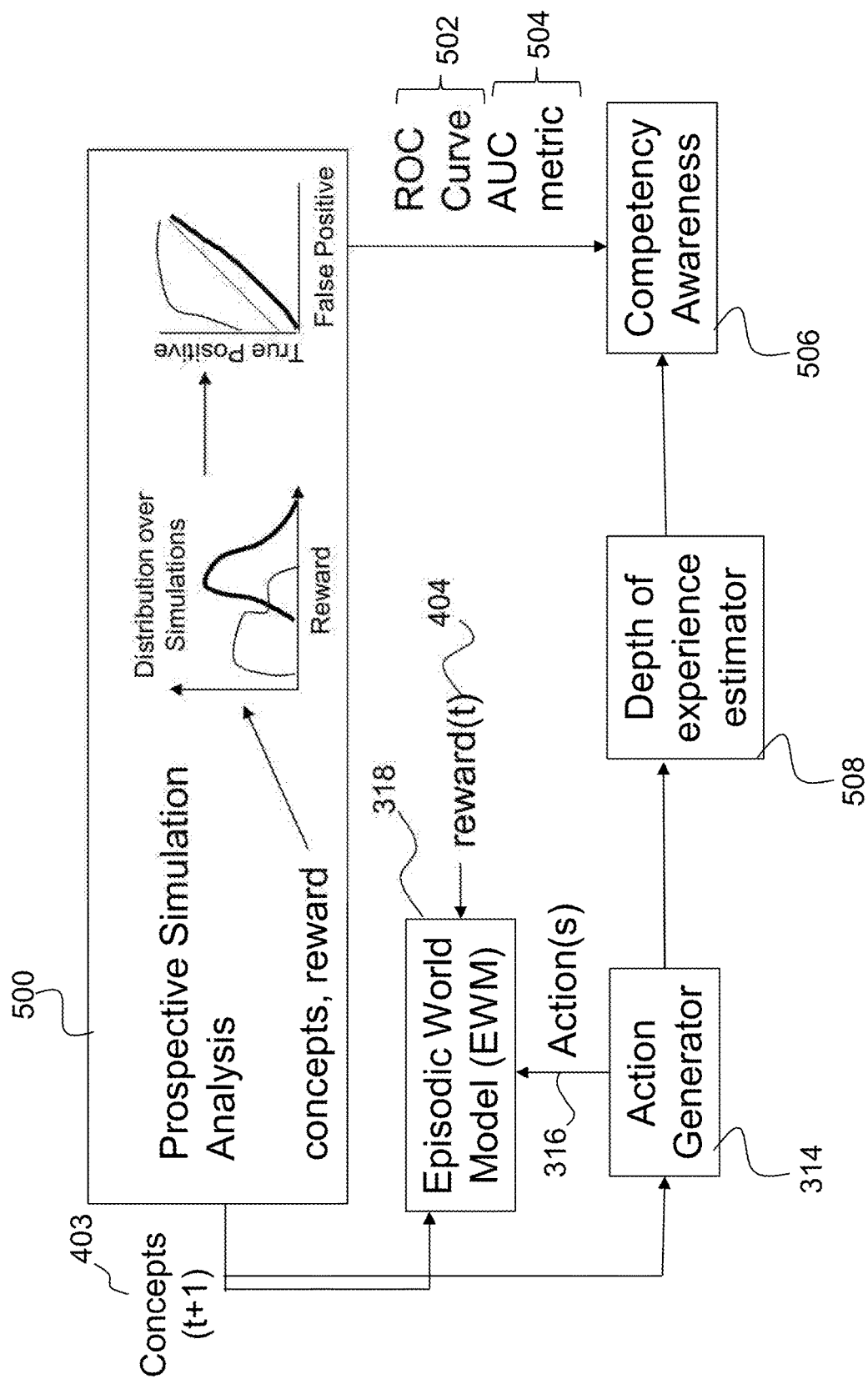
FIG. 5 is an illustration of how the Episodic World Model predicts the future based on efficiently encoded past experiences according to some embodiments of the present disclosure.

The low-dimensional latent space representation of the environment provided by the Perception module (element 310) feeds into the EWM (element 318), which stores sequential episodic experiences associated with actions (element 316) that the system takes during those experiences, together with a normalized reward value, as illustrated in FIG. 5. The EWM (element 318) consists of an autoregressive recurrent network and a discretized index code that constrains the simulations to be contextually relevant (see Literature Reference No. 12). By basing the invention's internal model on the mammalian memory system, past experiences can be generated to assess performance related to any condition of interest, as well as to provide constrained estimates of performance in related but unseen new scenarios. These generated experiences take the form of prospective simulations based on some initial conditions, and facilitate robust competency assessment for those conditions for various strategies. By generating highly accurate simulations that can roll out recursively many timesteps, we can increase the fidelity of competency metrics and improve the reliability of the system's behavior. An innovation of the described invention is to continually incorporate discovered meta-knowledge into the EWM (element 318) to boost simulation accuracy of previous experiences and improve generalization to new scenarios.

(3.4) Episodic World Model (EWM) (Element 318)

The EWM (element 318) model learns an efficient forward model of world dynamics conditioned by the system's actions. When an input state (in the form of a family of possible distributions of concepts conditioned on the current action) is presented along with an associated set of actions, the EWM (element 318) predicts the next reward (t+1) (element 402), next concept (t+1) (element 403), and termination of the current episode. t+1 refers to the next frame in discrete-time. It depends on the speed of operation of the autonomous system (e.g., 30 Hertz for an autonomous car). Each rollout operates within a compressed low-dimensional latent space of prior experiences. These experiences are encoded into a heterogeneous network modeled after the CA3 and dentate gyrus (DG) circuits in the hippocampus to achieve pattern completion and separation capabilities, respectively (see Literature Reference Nos. 3 and 12).

Task-specific reward functions generate the rewards (element 404), which are moment-by-moment evaluations of the system's performance. As an example of a reward (element 404) function for an autonomous driving system, the rules of driving, learned in driver training courses and manuals and embodied in signs and road markings, can be used to supply a score for safe operation of the vehicle (element 304). A more advanced reward (element 404) function might add goal-oriented rewards (e.g., how efficiently did the vehicle get to a goal location). The EWM (element 318) is prior art by the authors of this disclosure, implemented by interconnected recurrent heterogeneous networks (see Literature Reference No. 3). During the first online period following the application of the invention to the system, training of EWM (element 318) is accomplished in a self-supervised manner, using input percepts (element 406) encoded into a latent representation concepts by an autoencoder (element 400) in the Perception module (element 310), resulting in encoded percepts (element 401). Training of EWM (element 318) (illustrated in FIG. 4) does not require labels and is accomplished in a self-supervised manner (i.e., by minimizing reconstruction error (which could also be called prediction error) of each frame).

The invention facilitates incremental learning and avoids catastrophic forgetting by additionally using all prior experience data from online periods that can be stored in an explicit memory buffer, as well as from retrospective simulations (replays) based on the most current EWM (element 318) and Action Generator (element 314) for various random initial conditions and different task objectives. Further, the prediction error ("surprise") is employed as a multiplier of the encoding strength of experiences in the EWM (element 318), whereby frames with high predictive error are presented multiple times until a performance criterion is achieved.

During the second online period, the raw experiences of the system continue to be logged in the FIFO (first-in, first-out) memory buffer. Then offline, the autoencoder (element 400) is updated with the new and prior data. Next, the Action Generator (element 314) is re-optimized, using the Action Generator (element 314) evolved in the first offline period to seed the networks for the new cycle of neuroevolution. Following this step, concepts, rule lists, and policy explanations are re-extracted. Given that the autoencoder (element 400), the Action Generator (element 314), and the concepts (element 320) have all likely been updated, especially with the content and number of meta-knowledge concepts changing, the EWM (element 318) needs to be re-organized as well, by retraining with the experiences in the memory buffer. This process continues over subsequent online and offline periods, with the expectation that the autoencoder (element 400), Action Generator (element 314), concepts (element 320), and the EWM (element 318) will eventually stabilize as the core set of experiences and task strategies of the trained system are explored. However, the invention is always capable of incorporating any new strategies manifested by the system, as well as any new meta-knowledge encountered during new experiences.

(3.5) Prospective Simulation Analysis (Element 500) and Competency Estimation (Elements 506 and 508)

The EWM (element 318) generates forward projections of performance based on past experiences starting from any condition of interest, as well as provides constrained estimates of performance in related but unseen new scenarios. These generated experiences facilitate robust competency assessment of the system's ability to achieve desired performance metrics over the near future, as shown in FIG. 5. Each rollout operates within the compressed low-dimensional latent space of EWM (element 318) memories, with the stochastic modeling of the next state (element 326) in the form of a probability distribution aided by the index code. The initial state is encoded as a latent vector and a particular action is sampled from the Action Generator (element 314). A generated sample from the predictive distribution is saved and used as input for the next time step (i.e., t+1), which, in turn, will sample a new action and next state (element 326). This process can be continued ad-hoc as necessary until either the end of the episode is predicted or for some prescribed length. Each memory recall from the EWM (element 318) during the simulation includes a reward metric (described in detail below), and those metrics are combined to form a final cumulative reward value. There may be different ways of computing the cumulative reward of a particular simulation, which may be dependent on the type of reward or the task. For example, if the reward of an autonomous vehicle is to follow the rules of the road and keep the driver safe, then the cumulative reward might be the minimum reward value achieved during the simulation. However, if the reward is simply reaching a destination, the cumulative reward would be the maximum reward value achieved. Each simulation is tallied in a labeled histogram as illustrated in FIG. 5. Lure and target simulations are run, where a target simulation uses actions (element 316) selected by the Action Generator (element 314) during the simulation, and a lure simulation chooses randomly from any action but the one selected by the Action Generator (element 314). A ROC curve (element 502) is constructed from these two distributions in the standard way by plotting, for each reward, a true positive is a value from the target simulations, and a false positive is a value from the lures. The ROC curve (element 502) plots the true positive rate vs. the false positive rate. The conventional metric of Area Under the Curve (AUC) (element 504) is then applied, revealing how likely it is that the system can achieve a good outcome in the simulated future.

The EWM (element 318) predicts the future based on efficiently encoded past experiences. The latent representation conditioned on the current action is used to learn a predictive distribution over possible next states. Once encoded in the latent space, many prospective simulations can be generated by feeding the stochastic temporal predictions of the EWM (element 318) back on itself. The distributions of cumulative reward from these simulations for target and lure tasks will determine a ROC curve for each strategy, and the AUC metric represents the competency of the system for the time period simulated.

Competency assessments (i.e., competency awareness (element 506)) of the future hold only for a period that is limited to the maximum length of accurate predictions from the system. Prediction accuracy is a function of the depth of experience stored in the invention (described below), the frame rate or the length of time of each iteration stored in the EWM (element 318), the randomness of sampling of potential actions from each iteration through the Action Generator (element 314), and the number of prospective simulation iterations into the future.

Figure 6C:
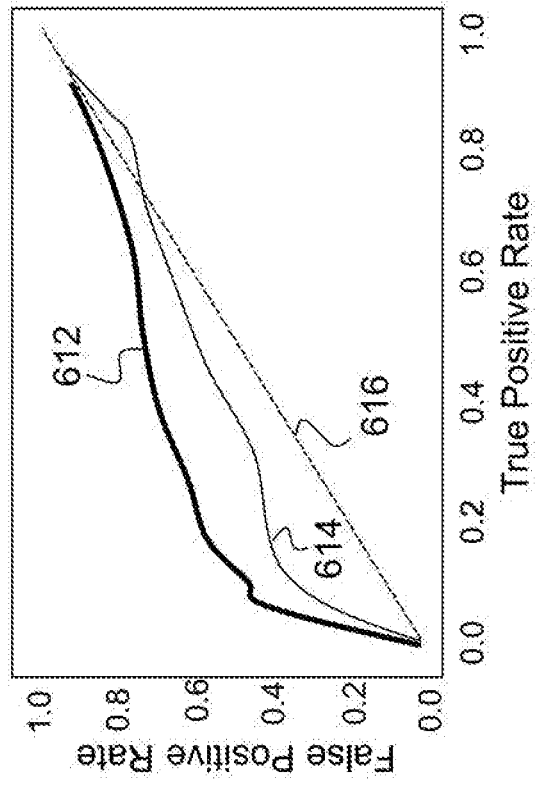
FIG. 6C illustrates average receiver operating characteristic (ROC) curves derived from simulations for each of twenty true episodes according to some embodiments of the present disclosure.

A pilot study was performed to explore the effectiveness of these prospective simulations in preserving existing knowledge in the service of incremental learning (see Literature Reference No. 3). The results are illustrated in FIGS. 6A-6D. Here, using a set of Atari games as tasks, it was found that interleaving the prospective simulations of previously learned tasks with new tasks preserves the learned temporal prediction across several tasks. FIGS. 6A and 6B show prospective stimulations' true and lure reward distributions for an agent trained on twenty million frames (FIG. 6A) from the game, and a separate agent trained on less than one million (FIG. 6B) to derive good and bad performing agents. In FIG. 6A, unfilled solid line areas (element 600) represent true reward distributions for an agent trained on twenty million (20 M) frames, unfilled dashed line areas (element 602) represent lure reward distributions, and filled areas (element 604) represent areas of overlap. In FIG. 6B, unfilled solid line areas (element 606) represent true reward distributions for an agent trained on one million (1 M) frames, unfilled dashed line areas (element 608) represent lure reward distributions, and filled areas (element 610) represent areas of overlap.

Figure 6D:
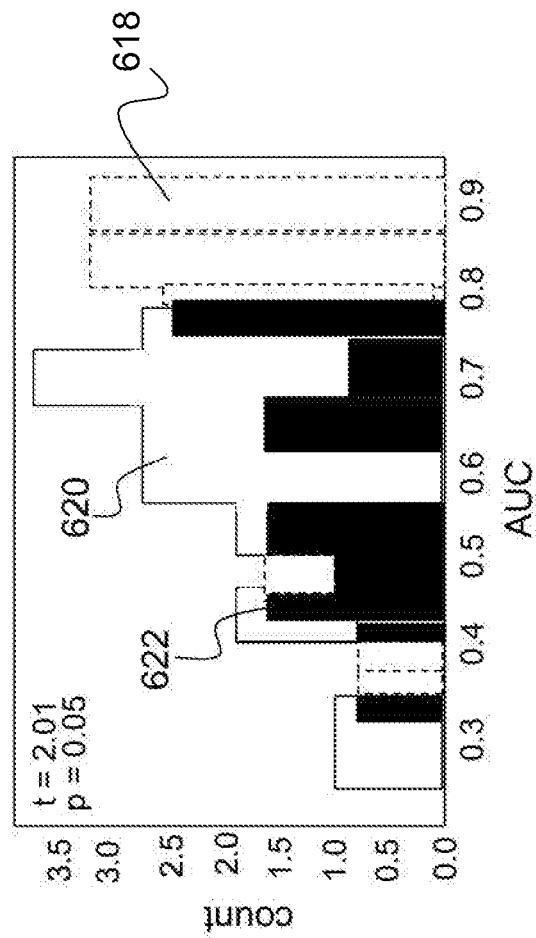
FIG. 6D illustrates distribution of area under the ROC curve (AUC) scores from the twenty true episodes according to some embodiments of the present disclosure.

FIG. 6C shows the average ROC curves derived from 20 simulations of 50 time steps, for each of 20 true episodes, for an agent trained on 20 M frames (element 612) and 1 M frames (element 614). The dashed line (element 616) represents a non-discriminatory test. As shown in FIG. 6C, the prospective simulations are able to differentiate the 20 M policy from the 1 M policy based on their respective ROC curves. FIG. 6D depicts distribution of AUC scores from those 20 true episodes showing a significantly higher AUC for the well trained agent. Unfilled dashed line areas (element 618) represent distributions for an agent trained on 20 M frames, unfilled solid line areas (element 620) represent distributions for an agent trained on 1 M frames, and filled areas (element 622) represent areas of overlap. These plots show this architecture can simulate a diversity of potential experiences; however, on average, they reflect the true behavior of the environment such that experienced and novice policies can be reliably differentiated.

(3.6) Depth of Experience Estimator (DoEE) (Element 508)

The DoEE (element 508) provides a reliable estimate of how often a strategy has been employed in the service of a particular task objective under a given environmental condition. This is learned online using an Evolving Neural Turing Machine (ENTM) (see Literature Reference No. 7) by estimating the density of visitation at any point in the learned latent space conditioned on a given task objective and strategy, while also robustly generalizing across very similar states. The ENTM is trained to mimic a Gaussian Process (GP) model of visitation density. Because of its evolutionary optimization and its Turing complete properties, the ENTM is trained to learn a general algorithm for providing smooth visitation estimates conditioned on a given task and strategy. One can iteratively train a GP model on a set of data that includes a sequence of observations in the EWM's (element 318) latent space that are made using a specific strategy to accomplish a particular task. The ENTM stores the fact that these observations have been made, and is evolved to minimize a loss based on the distance between its estimates and the GP estimates of visitation density. In the next iteration of this process, the dataset is augmented by new observations, a new GP is trained on this new dataset, the ENTM is provided just the new observations, and again evaluated on its ability to approximate the latest iteration of the GP visitation density. This iterative training process can continue indefinitely, where the end result will be an ENTM that uses its internal memory to provide estimates of conditional visitation density in an online fashion. Due to the Bayesian nature of the GP model, it can be used when little data is available. This also has the added benefit of an explicit measure of uncertainty on its density estimates. The GP model itself could also be used instead of ENTM by adopting online batch learning methods, which do not require the complete history of data to be stored (Literature Reference No. 1).

(3.7) Competency Awareness (CA) (Element 506)

The competency awareness (element 506) module takes as input the normalized competency assessment metric (CAM) (element 328) and the depth-of-experience estimation (DoEE), and compares the result with a user-defined minimal required level of competence. One method would be to multiply them (e.g., competency=CAM*norm (DoEE)). The DoEE can be normalized by establishing some desirable DoEE (e.g., norm(DoEE)=min (1, DoEE/(desirable_DoEE)). In one embodiment, the CAM and the DoEE are handled separately. A minimum allowable level of CAM is established, and a minimum allowable level of DoEE is established. If either of those metrics falls below their established minima, the CA (element 506) module either issues a warning or alarm, and/or actively initiates a handover of control (element 306) of the autonomous system to a user. For example, in an autonomous driving system (e.g., self-driving vehicle), handover of control (element 306) can mean that one or more vehicle components (e.g., braking mechanism, steering mechanism, acceleration mechanism) is no longer controlled by the autonomous system and requires a user to control the vehicle components to drive and maneuver the vehicle.

Semi-automated control systems include driver safety and support systems. Developers of autonomous vehicles will establish the minimum acceptable proficiency rating (MAPR) for their vehicles, and this will eliminate accidents caused by controllers that cannot anticipate situational proficiency. The invention described herein will allow human users to engage with autonomous control systems with confidence, knowing that their autonomous vehicles will not attempt situations they cannot handle. This is especially important in complex, time-critical, dynamic environments. Developers of semi-autonomous vehicles are also in need of a way to decide when the human user is not very proficient in handling a current upcoming situation based on their actions in similar prior situations, and could benefit from assistive technology to take over partial or complete control of the vehicle for the safety of the occupants. Therefore, the invention described herein causes a safety and/or efficacy override of either the autonomous system or a human user when at least one of the competency metric and experience metric falls below the established minimum allowable value.

Further, level of autonomy can be an issue in some systems, where a variable autonomy system such as an unmanned aircraft could sometimes be flown without supervision to a location, but the operators must stay in control the entire time in case some problem arises. The inventive system according to embodiments of the present disclosure would allow operators to raise the level of autonomy of these systems for longer time periods because they would be more capable of judging their ability to handle situations. There has long been a need for assistive systems such as "pilot associates" that can intelligently decide how much assistance a pilot or driver needs. The invention described herein can be used to better predict when the user does in fact need help, leading to better acceptance of the assistive technology.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for safety and efficacy override of an autonomous system, the system comprising:
one or more processors and a non-transitory computer-readable medium having executable instructions encoded thereon such that when executed, the one or more processors perform operations of:
extracting a plurality of semantic concepts representing a situation;
associating actions taken by the autonomous system with a set of semantic concepts that are activated when the actions are taken in the situation;
using task-specific reward functions of the autonomous system's performance, measuring an outcome of the actions taken in the situation and generating a reward metric;
storing the plurality of semantic concepts representing the situation together with the actions taken in the situation and the reward metric as sequential episodic experiences;
decomposing a new situation into a set of semantic concepts;
performing a series of stochastic prospective simulations using the set of semantic concepts and the stored sequential episodic experiences;
determining a measure of competence of the autonomous system for handling the new situation based on the series of stochastic prospective simulations;
maintaining competent operational control of the autonomous system when the measure of competence is above an established minimum allowable value; and
generating an alert when the measure of competence falls below the established minimum allowable value.

2. The system as set forth in claim 1, wherein the one or more processors further perform an operation of determining a depth-of experience estimation (DoEE), wherein the DoEE is an estimate of how often an action has been taken by the autonomous system in a given situation.

3. The system as set forth in claim 1, wherein the measure of competence is a Receiver-Operator Characteristic (ROC) curve-based measure of competence.

4. The system as set forth in claim 1, wherein the one or more processors further perform an operation of initiating handover of control of the autonomous system to a human user when the measure of competence falls below the established minimum allowable value.

5. The system as set forth in claim 1, wherein the one or more processors further perform an operation of initiating handover of control from a human user to an assistive system when the measure of competence falls below the established minimum allowable value.

6. The system as set forth in claim 1, wherein the autonomous system is an autonomous driving system.

7. A computer implemented method for safety and efficacy override of an autonomous system, the method comprising an act of:
causing one or more processors to execute instructions encoded on a non-transitory computer-readable medium, such that upon execution, the one or more processors perform operations of:
extracting a plurality of semantic concepts representing a situation;
associating actions taken by the autonomous system with a set of semantic concepts that are activated when the actions are taken in the situation;
using task-specific reward functions of the autonomous system's performance, measuring an outcome of the actions taken in the situation and generating a reward metric;
storing the plurality of semantic concepts representing the situation together with the actions taken in the situation and the reward metric as sequential episodic experiences;
decomposing a new situation into a set of semantic concepts;
performing a series of stochastic prospective simulations using the set of semantic concepts and the stored sequential episodic experiences;
determining a measure of competence of the autonomous system for handling the new situation based on the series of stochastic prospective simulations;
maintaining competent operational control of the autonomous system when the measure of competence is above an established minimum allowable value; and
generating an alert when the measure of competence falls below the established minimum allowable value.

8. The method as set forth in claim 7, wherein the one or more processors further perform an operation of determining a depth-of experience estimation (DoEE), wherein the DoEE is an estimate of how often an action has been taken by the autonomous system in a given situation.

9. The method as set forth in claim 7, wherein the measure of competence is a Receiver-Operator Characteristic (ROC) curve-based measure of competence.

10. The method as set forth in claim 7, wherein the one or more processors further perform an operation of initiating handover of control of the autonomous system to a human user when the measure of competence falls below the established minimum allowable value.

11. The method as set forth in claim 7, wherein the one or more processors further perform an operation of initiating handover of control from a human user to an assistive system when the measure of competence falls below the established minimum allowable value.

12. The method as set forth in claim 7, wherein the autonomous system is an autonomous driving system.

13. A computer program product for safety and efficacy override of an autonomous system, the computer program product comprising:
computer-readable instructions stored on a non-transitory computer-readable medium that are executable by a computer having one or more processors for causing the processor to perform operations of:
extracting a plurality of semantic concepts representing a situation;
associating actions taken by the autonomous system with a set of semantic concepts that are activated when the actions are taken in the situation;
using task-specific reward functions of the autonomous system's performance, measuring an outcome of the actions taken in the situation and generating a reward metric;
storing the plurality of semantic concepts representing the situation together with the actions taken in the situation and the reward metric as sequential episodic experiences;
decomposing a new situation into a set of semantic concepts;
performing a series of stochastic prospective simulations using the set of semantic concepts and the stored sequential episodic experiences;
determining a measure of competence of the autonomous system for handling the new situation based on the series of stochastic prospective simulations;
maintaining competent operational control of the autonomous system when the measure of competence is above an established minimum allowable value; and
generating an alert when the measure of competence falls below the established minimum allowable value.

14. The computer program product as set forth in claim 13, further comprising instructions for causing the one or more processors to further perform an operation of determining a depth-of experience estimation (DoEE), wherein the DoEE is an estimate of how often an action has been taken by the autonomous system in a given situation.

15. The computer program product as set forth in claim 13, wherein the measure of competence is a Receiver-Operator Characteristic (ROC) curve-based measure of competence.

16. The computer program product as set forth in claim 13, further comprising instructions for causing the one or more processors to further perform an operation of initiating handover of control of the autonomous system to a human user when the measure of competence falls below the established minimum allowable value.

17. The computer program product as set forth in claim 13, further comprising instructions for causing the one or more processors to further perform an operation of initiating handover of control from a human user to an assistive system when the measure of competence falls below the established minimum allowable value.

18. The computer program product as set forth in claim 13, wherein the autonomous system is an autonomous driving system.

19. The system as set forth in claim 1, wherein the series of stochastic prospective simulation are performed for each of a task objective and a lure objective, thereby yielding target and lure distributions of performance estimates for a given action.

20. The system as set forth in claim 19, wherein the one or more processors further perform operations of:
generating a Receiver-Operator Characteristic (ROC) curve from each of the target and lure distributions, wherein the target distribution represents true positive values and the lure distribution represents false positive values; and
determining an Area Under the Curve (AUC) metric for the target and lure distributions, wherein the AUC metric represents competency of the autonomous system in the new situation.

* * * * *